(12) United States Patent
Harle et al.

(10) Patent No.: US 6,436,280 B1
(45) Date of Patent: *Aug. 20, 2002

(54) CATALYST FOR HYDROTREATING HYDROCARBON FEEDS IN A FIXED BED REACTOR

(75) Inventors: Virginie Harle, Lamorlaye; Slavik Kasztelan, Rueil-Malmaison; Stéphane Kressmann, Serezin du Rhone; Frédéric Morel, Francheville, all of (FR)

(73) Assignee: Institut Français du Petrole, Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,518

(22) Filed: Dec. 9, 1999

(30) Foreign Application Priority Data

Dec. 10, 1998 (FR) .............................. 98 15596

(51) Int. Cl.⁷ .......................... B01J 23/24; B01J 23/74; B01J 35/00; C10G 45/08
(52) U.S. Cl. ............. 208/216 R; 208/217; 208/251 H; 208/254 H; 502/305; 502/313; 502/314; 502/315; 502/321; 502/325; 502/337
(58) Field of Search ................. 502/305, 313, 502/314, 315, 321, 325, 337; 208/216 R, 217, 251 H, 254 H

(56) References Cited

U.S. PATENT DOCUMENTS

| 4,499,203 A | * | 2/1985 | Toulhoat et al. |
| 4,510,263 A | * | 4/1985 | Pereira et al. |
| 4,552,650 A | * | 11/1985 | Toulhoat et al. |
| 4,579,649 A | | 4/1986 | Morales et al. ......... 208/251 H |
| 5,244,648 A | * | 9/1993 | Dupin et al. |
| 6,037,300 A | * | 3/2000 | Kasztelan et al. |
| 6,043,187 A | * | 3/2000 | Harle et al. |
| 6,090,745 A | * | 7/2000 | DuBois et al. |

FOREIGN PATENT DOCUMENTS

| EP | 0 526 988 | | 2/1993 |
| EP | 0 748 652 | | 12/1996 |
| EP | 0 848 992 | | 6/1998 |
| FR | 2 528 721 | | 12/1983 |
| FR | 2 749 778 | | 12/1997 |
| FR | 2 764 213 | | 12/1998 |
| GB | 1493928 A | * | 11/1977 |

* cited by examiner

Primary Examiner—Stanley S. Silverman
Assistant Examiner—Christina Ildebrando
(74) Attorney, Agent, or Firm—Millen, White, Zelano & Branigan, P.C.

(57) ABSTRACT

The present invention relates to a catalyst comprising an extruded essentially alumina-based support, constituted by a plurality of juxtaposed agglomerates partially in the form of packs of flakes and partially in the form of needles, and comprising at least one catalytic metal or a compound of a catalytic metal from group VIB, and/or optionally at least one catalytic metal or compound of a catalytic metal from group VIII. The catalyst also comprises at least one dopant selected from the group formed by boron, phosphorous, silicon (or a silica different from that subsequently added to the support) and halogens. The invention also relates to its use in a fixed bed reactor, for hydrorefining and hydroconverting hydrocarbon feeds.

24 Claims, No Drawings

CATALYST FOR HYDROTREATING HYDROCARBON FEEDS IN A FIXED BED REACTOR

The present invention relates to a catalyst for hydrorefining and/or hydroconverting hydrocarbon feeds (also known as hydrotreatment), the catalyst comprising an essentially alumina-based support in the form of extrudates, at least one catalytic metal or a compound of a catalytic metal from group VIB (group 6 in the new periodic table notation), preferably molybdenum or tungsten, more preferably molybdenum, and/or optionally at least one catalytic metal or a compound of a catalytic metal from group VIII (group 8 in the new periodic table notation), preferably iron, nickel or cobalt. The catalyst also contains at least one dopant selected from the group formed by boron, phosphorous, group VII elements (halogens) and silicon (or a silica different from that which may be naturally present in the starting support selected for the production of the catalyst).

The present invention also relates to methods for preparing the catalyst, also to its use for hydrorefining and hydroconverting hydrocarbon feeds such as petroleum cuts, cuts originating from coal, or hydrocarbons produced from natural gas.

Hydrotreatment of hydrocarbon feeds, such as sulphur-containing petroleum cuts, is becoming more and more important in refining with the increasing need to reduce the quantity of sulphur in petroleum cuts and to convert heavy fractions into lighter fractions which can be upgraded as a fuel. Both to satisfy the specifications imposed in every country for commercial fuels and for economical reasons, imported crudes which are becoming richer and richer in heavy fractions and in heteroatoms and more and more depleted in hydrogen must be upgraded to the best possible extent. This upgrading implies a relatively large reduction in the average molecular weight of heavy constituents, which can be obtained, for example, by cracking or hydrocracking the pre-refined feeds, i.e., desulphurized and denitrogenated feeds. Van Kessel et al. explained this subject in detail in an article published in the review "Oil & Gas Journal", Feb. 16$^{th}$ 1987, pages 55 to 66.

The skilled person is aware that during hydrotreatment of petroleum fractions containing organometallic complexes, the majority of those complexes are destroyed in the presence of hydrogen, hydrogen sulphide, and a hydrotreatment catalyst. The constituent metal of such complexes then precipitates out in the form of a solid sulphide which then becomes fixed on the internal surface of the pores. This is particularly the case for vanadium, nickel, iron, sodium, titanium, silicon, and copper complexes which are naturally present to a greater or lesser extent in crude oils depending on the origin of the crude and which, during distillation, tend to concentrate in the high boiling point fractions and in particular in the residues. This is also the case for liquefied coal products which also comprise metals, in particular iron and titanium. The general term hydrodemetallization (HDM) is used to designate those organometallic complex destruction reactions in hydrocarbons.

The accumulation of solid deposits in the catalyst pores can continue until a portion of the pores controlling access of reactants to a fraction of the interconnected pore network is completely blocked so that that fraction becomes inactive even if the pores of that fraction are only slightly blocked or even intact. That phenomenon can cause premature and very severe catalyst deactivation. It is particularly sensitive in hydrodemetallization reactions carried out in the present of a supported heterogeneous catalyst. The term "heterogeneous" means not soluble in the hydrocarbon feed. In that case, it has been shown that pores at the grain periphery are blocked more quickly than central pores. Similarly, the pore mouths block up more quickly than their other portions. Pore blocking is accompanied by a gradual reduction in their diameter which increasingly limits molecule diffusion and increases the concentration gradient, thus accentuating the heterogeneity of the deposit from the periphery to the interior of the porous particles to the point that the pores opening to the outside are very rapidly blocked: access to the practically intact internal pores of the particles is thus denied to the reactants and the catalyst is prematurely deactivated.

The phenomenon described above is known as pore mouth plugging (see French patent application 97/07150 in this regard).

A catalyst for hydrotreating heavy hydrocarbon cuts containing metals must thus be composed of a catalytic support with a porosity profile which is particularly suitable for the specific diffusional constraints of hydrotreatment, in particular hydrodemetallization.

The catalysts usually used for hydrotreatment processes are composed of a support on which metal oxides such as cobalt, nickel or molybdenum oxides are deposited. The catalyst is then sulphurated to transform all or part of the metal oxides into metal sulphide phases. The support is generally alumina-based, its role consisting of dispersing the active phase and providing a texture which can capture metal impurities, while avoiding the blocking problems mentioned above.

Catalysts with a particular pore distribution have been described in United States patent U.S. Pat. No. 4,395,329. There are two types of prior art alumina-based supports. Firstly, alumina extrudates prepared from an alumina gel. Hydrotreatment catalysts prepared from such extrudates have a number of disadvantages. Firstly, the process for preparing the alumina gel is particularly polluting, in contrast to that of alumina originating from rapid dehydration of hydrargillite, known as flash alumina. Then the pores of alumina gel based supports are particularly suitable for hydrodesulphuration and hydrotreatment of light hydrocarbons, and not for other types of hydrotreatment. Further, even though such extrudates are balanced in their hydrodemetallization/hydrodesulphuration ratio, their hydrometallization retention capacity is low, in general at most 30% by weight, so they are rapidly saturated and have to be replaced. Further, considering the high production cost of the alumina gel, the manufacture of such catalysts is very expensive.

Secondly, alumina beads prepared by rapid dehydration of hydrargillite then agglomerating the flash alumina powder obtained are used as a support for catalysts for hydrotreatment of hydrocarbon feeds containing metals. The cost of preparing these beads is lower, however, in order to maintain it at a satisfactory level, beads with a diameter of more than 2 mm have to be prepared. As a result, the metals cannot be introduced right into the core of the beads, and the catalytic phase located there is not used.

Hydrotreatment catalysts prepared from flash alumina extrudates which are smaller and which have a porosity which is suitable for hydrotreatment would not have all of those disadvantages, but there is currently no industrial process for preparing such catalysts.

The present invention concerns a catalyst for hydrotreating carbon-containing fractions, processes for preparing that catalyst, and its use in hydrotreatment reactions, in particular hydrogenation, hydrodenitrogenation, hydrodeoxygenation, hydrodearomatization, hydroisomerisation, hydrodealkylation, hydrodewaxing, hydrocracking, and hydrodesulphuration with a hydrodemetallising activity which is at least equivalent to that of catalysts currently known to the skilled person, to obtain particularly high hydrotreatment results with respect to prior art products.

The catalyst of the invention comprises an essentially alumina-based support in the form of extrudates, optionally at least one catalytic metal or a compound of a catalytic metal from group VIB (group 6 in the new periodic table notation), preferably molybdenum or tungsten, more preferably molybdenum, and/or at least one catalytic metal or a compound of a catalytic metal from group VIII (group 8 in the new periodic table notation), preferably iron, nickel or cobalt, more preferably nickel.

The invention is also characterized in that, to further improve the capacities of the catalyst in hydrotreatment reactions, at least one dopant is incorporated into the catalyst, which dopant is selected from the group formed by phosphorous, boron, silicon (or a silica different from that which can be found in the support) and halogens. This dopant produces better performances for refining (hydrogenation, hydrodesulphurisation, hydrodemetallisation and hydrodecarbonisation) and conversion linked to an increase in the hydrogenation activity and acidity of the catalyst.

The extruded support used in the catalyst of the invention is generally and preferably essentially based on alumina agglomerates, the alumina agglomerates generally and preferably being obtained by forming a starting alumina originating from rapid dehydration of hydrargillite, and generally having a total pore volume of at least 0.6 cm$^3$/g, an average mesoporous diameter in the range 15 to 36 nm (nanometers), and generally a quantity of alumina originating from boehmite decomposition in the range 5% to 70% by weight. The term "alumina originating from boehmite decomposition" means that during the extrudate preparation process, boehmite type alumina is produced to the point of representing 5% to 70% by weight of the total alumina, then decomposed. This quantity of alumina from boehmite decomposition is measured by X ray diffraction of the alumina before decomposing the boehmite.

The extruded support of the catalyst of the invention can also be obtained by extruding a mixture of varying proportions of an alumina powder from rapid dehydration of hydrargillite (flash alumina) and at least one alumina gel obtained, for example, by precipitating aluminium salts such as aluminium chloride, aluminium sulphate, aluminium nitrate, or aluminium acetate, or by hydrolysis of aluminium alkoxides such as aluminium triethoxide. Such mixtures of flash alumina and alumina gel contain less than 50% by weight of alumina gel, preferably 1% to 45% of alumina gel.

The catalyst of the invention can be prepared using any method which is known to the skilled person, more particularly using the methods described below.

The support is formed by alumina extrudates with a diameter generally in the range 0.5 to 10 mm, preferably 0.8 to 3.2 mm, when the catalyst is used in a fixed bed, the extrudates having the characteristics described above. Any known method can be used to introduce the catalytic metals, at any stage of the preparation, preferably by impregnation or co-mixing, onto the extrudates or prior to their forming by extrusion, the optional catalytic metals being at least one catalytic metal or a compound of a catalytic metal from group VIB (group 6 in the new periodic table notation), preferably molybdenum or tungsten, more preferably molybdenum, and/or at least one catalytic metal or a compound of a catalytic metal from group VIII (group 8 in the new periodic table notation), preferably iron, nickel or cobalt, more preferably nickel. The metals can optionally be mixed with the support by co-mixing at any step of the support preparation process. When there is a plurality, at least part of the group VIB and VIII metals can optionally be introduced separately or simultaneously during impregnation or co-mixing with the support, at any stage of forming or preparation.

The manner of introducing the dopant will be described below.

The catalyst of the invention can be prepared using a preparation process comprising the following steps:

a) co-mixing alumina powder originating from rapid dehydration of hydrargillite and optionally an alumina gel with at least one compound of a catalytic metal from group VIB and/or at least one compound of a catalytic metal from group VIII, optionally followed by ageing, and/or drying, then optional calcining;

b) forming by extruding the product obtained from step a).

The metals cited above are usually introduced into the catalyst in the form of precursors such as oxides, acids, salts, or organic complexes. The sum S of the group VIB and VIII metals, expressed as the oxides introduced into the catalysts, is in the range 0.1% to 50% by weight, preferably 0.5% to 40% by weight, more preferably 0.5% to 25% by weight.

The preparation then generally comprises ageing and drying, then generally a heat treatment, for example calcining, at a temperature in the range 400° C. to 800° C.

The support the use of which is one of the essentially elements of the invention is essentially alumina-based. The support used in the catalyst of the invention is generally and preferably obtained by forming a starting alumina originating from rapid dehydration of hydrargillite, forming preferably being carried out using one of the processes described below.

Processes for preparing the support of the invention are described below for a support constituted by alumina. When the support contains one or more other compounds, the compound or compounds or a precursor of the compound or compounds may be introduced at any stage in the process for preparing the support of the invention. It is also possible to introduce the compound or compounds by impregnating the formed alumina using the compound or compounds or any precursor of the compound or compounds.

A first process for forming a starting alumina originating from rapid dehydration of hydrargillite comprises the following steps:

$a_1$ starting with an alumina originating from rapid dehydration of hydrargillite;

$b_1$ rehydrating the starting alumina;

$c_1$ mixing the rehydrated alumina in the presence of an emulsion of at least one hydrocarbon in water;

$d_1$ extruding the alumina-based paste obtained from step $c_1$;

$e_1$ drying and calcining the extrudates;

$f_1$ carrying out a hydrothermal acid treatment in a confined atmosphere on the extrudates from step $e_1$;

$g_1$ drying and calcining the extrudates from step $f_1$.

A second process for forming the alumina from a starting alumina originating from rapid dehydration of hydrargillite comprises the following steps:

$a_2$ starting from a starting alumina originating from rapid dehydration of hydrargillite;

$b_2$ forming the alumina into beads in the presence of a pore-forming agent;

$c_2$ ageing the alumina beads obtained;

$d_2$ mixing the beads from step $c_2$ to obtain a paste which is extruded;

$e_2$ drying and calcining the extrudates obtained;

$f_2$ carrying out a hydrothermal acid treatment in a confined atmosphere on the extrudates obtained from step $e_2$;

$g_2$ drying and calcining the extrudates from step $f_2$.

A third process for forming an alumina from a starting alumina originating from rapid dehydration of hydrargillite comprises the following steps:

$a_3$ starting from a starting alumina originating from rapid dehydration of hydrargillite;

$b_3$ rehydrating the starting alumina;

$c_3$ mixing the rehydrated alumina with a pseudo-boehmite gel, the gel being present in an amount in the range 1% to 30% by weight with respect to the rehydrated alumina and the gel;

$d_3$ extruding the alumina-based paste obtained from step $c_3$;

$e_3$ drying and calcining the extrudates obtained;

$f_3$ carrying out a hydrothermal acid treatment in a confined atmosphere on the extrudates obtained from step $e_3$;

$g_3$ optionally drying then calcining the extrudates from step $f_3$.

This process uses identical steps to steps $a_1$, $b_1$, $d_1$, $e_1$, $f_1$ and $g_1$ of the first process described above.

However in step $c_3$, the rehydrated alumina from step $b_3$ is not mixed with a hydrocarbon emulsion but with a pseudo-boehmite gel in an amount in the range 1% to 30% by weight with respect to the rehydrated alumina and the gel, preferably in the range 5% to 20% by weight.

Such a pseudo-boehmite gel can be obtained by precipitating aluminium salts such as aluminium chloride, aluminium sulphate, aluminium nitrate, or aluminium acetate with a base or by hydrolysis of aluminium alkoxides such as aluminium triethoxide.

Mixing can be carried out using any method known to the skilled person, in particular using a Z blade mixer or a twin screw mixer.

Water can be added to adjust the viscosity of the paste to be extruded.

The alumina extrudates of the invention generally and preferably have a total pore volume (TPV) of at least 0.6 cm³/g, preferably at least 0.65 cm³/g.

The TPV is measured as follows: the grain density and absolute density are determined: the grain densities (Dg) and absolute densities (Da) are measured using a mercury and helium picnometry method respectively, then the TPV is given by the formula:

$$TPV = \frac{1}{D_g} - \frac{1}{D_a}$$

The average mesoporous diameter of the extrudates of the invention is also generally and preferably in the range 15 to 36 nm (nanometers). The average mesoporous diameter for the given extrudates is measured using a graph of the pore distribution of said extrudates. It is the diameter for which the associated volume V on the graph is:

$$V = V_{100\,nm} + \frac{V_{6\,nm} - V_{100\,nm}}{2}$$

where $V_{100nm}$ represents the volume created by pores with a diameter of over 100 nm (macropores), or the macroporous volume;

$V_{6nm}$ represents the volume created by pores with a diameter of over 6 nm;

$V_{6nm}-V_{100nm}$ represents the mesoporous volume, i.e., the volume created by pores with a diameter in the range 6 nm and 100 nm, i.e., the volume created by all the pores with a size in the range 6 nm to 100 nm (mesopores).

These volumes are measured using the mercury penetration technique in which the Kelvin law is applied which defines a relationship between the pressure, the diameter of the smallest pore into which the diameter penetrates at that pressure, the wetting angle and the surface tension in the following formula:

$$\emptyset = (4t \cos\theta)10/P$$

where $\emptyset$ represents the pore diameter (in nm);

t represents the surface tension (48.5 Pa);

$\theta$ represents the angle of contact ($\theta=140°$); and

P represents the pressure (MPa).

The extrudates of the invention preferably have a mesoporous volume ($V_{6nm}-V_{100nm}$) of at least 0.3 cm³/g, more preferably at least 0.5 cm³/g.

The extrudates of the invention preferably have a macroporous volume ($V_{100nm}$) of at most 0.5 cm³/g. In a variation, the macroporous volume ($V_{100nm}$) is at most 0.3 cm³/g, more preferably at most 0.1 cm³/g and still more preferably at most 0.08 cm³/g.

These extrudates normally have a microporous volume ($V_{0-6nm}$) of at most 0.55 cm³/g, preferably at most 0.2 cm³/g. The microporous volume represents the volume created by pores with a diameter of less than 6 nm.

Such a pore distribution which minimises the proportion of pores of less than 6 nm and those of more than 100 nm while increasing the proportion of mesopores (with a diameter in the range 6 nm and 100 nm) is particularly adapted to the diffiusional constraints of hydrotreating heavy hydrocarbon cuts.

In a preferred variation, the pore distribution over the pore diameter range from 6 nm to 100 nm (mesopores) is extremely narrow at around 15 nm, i.e., in this range the diameter of the majority of pores is in the range 6 nm to 50 nm, preferably in the range 8 nm to 20 nm.

The specific surface area (SSA) of the extrudates of the invention is generally at least 120 m²/g, preferably at least 150 m²/g. This surface area is a BET surface area. The term "BET surface area" means the specific surface area determined by nitrogen adsorption in accordance with the standard ASTM D 3663-78 established using the BRUNAUER-EMMETT-TELLER method described in "The Journal of the American Society" 60, 309 (1938).

Preferably, the diameter of the extrudates of the invention is in the range 0.5 to 10 mm, preferably in the range 0.8 to 3.2 mm, and the length is in the range 1 mm to 20 mm, preferably in the range 1 to 10 mm, in particular when the catalyst is used in a fixed bed.

The average crushing strength (ACS) of these extrudates is generally at least 0.68 daN/mm for 1.6 mm extrudates, preferably at least 1 mm, and the crush strength (CS) is at least 1 MPa.

The method of measuring the average crushing strength (ACS) consists of measuring the type of maximum compression which an extrudate can support before it fails, when the product is placed between two planes being displaced at a constant speed of 5 cm/min.

Compression is applied perpendicular to one of the extrudate generatrices, and the average crushing strength is expressed as the ratio of the force to the length of the generatrix of the extrudate.

The method used to measure the crush strength (CS) consists of subjecting a certain quantity of extrudates to an increasing pressure over a sieve and recovering the fines resulting from crushing the extrudates. The crush strength corresponds to the force exerted to obtain fines representing 0.5% of the weight of the extrudates under test.

The alumina of the invention is essentially constituted by a plurality of juxtaposed agglomerates, each of these agglomerates generally and preferably being partially in the form of packs of flakes and partially in the form of needles, the needles being uniformly dispersed both around the packs of flakes and between the flakes.

In general, the length and breadth of the flakes varies between 1 and 5 $\mu$m with a thickness of the order of 10 nm. They can be packed in groups forming a thickness of the order of 0.1 to 0.5 $\mu$m, the groups possibly being separated from each other by a thickness of the order of 0.05 to 0.1 $\mu$m.

The needle length can be in the range 0.05 to 0.5 $\mu$m, their cross section is of the order of 10 to 20 nm. These dimensions are given by measuring the extrudates in electron microscope photographs. The alumina flakes principally comprise $\chi$ alumina and $\eta$ alumina and the needles are $\gamma$ alumina.

The flake structure is characteristic of the hydrargillite lineage of alumina, which means that before activation by calcining these extrudates have the same structure, the flakes being hydrargillite in nature. On calcining, this alumina in its hydrargillite form is principally transformed into dehydrated $\chi$ and $\eta$ aluminas In contrast, the needle structure is characteristic of a boehmite lineage, meaning that before activation by calcining, these extrudates have the same structure, this alumina being in the form of boehmite. Calcining transforms this boehmite alumina into dehydrated $\gamma$ alumina.

The extrudates of the invention are thus obtained by calcining, the extrudates being constituted by hydrargillite alumina-based flakes prior to calcining, the flakes being surrounded at their periphery by boehmite alumina-based needles.

The forming process of the invention is more particularly suitable for a starting alumina originating from rapid dehydration of Bayer hydrate (hydragillite) which is an industrially available aluminium hydroxide and extremely cheap.

Such an alumina is in particular obtained by rapid dehydration of hydrargillite using a hot gas stream, the temperature of the gas entering the apparatus generally being between about 400° C. and 1200° C., the contact time between the alumina and the hot gases generally being in the range from a fraction of a second to 4–5 seconds; such a process for preparing an alumina powder has been described in French patent FR-A1-1 108 011.

The alumina obtained can be used as it is or before undergoing step $b_1$, it can be treated to eliminate the alkalis present: a $Na_2O$ content of less than 0.5% by weight is preferable.

The starting alumina is preferably re-hydrated during step $b_1$ so that the boehmite type alumina content is at least 3% by weight, preferably at most 40% by weight.

The various steps of these processes for preparing alumina extrudates are described in more detail in a patent application entitled "Alumina extrudates, processes for their preparation and their use as catalysts or catalyst supports" by Rhône-Poulenc Chimie.

In addition to the support defined above, the catalyst used in the present invention comprises at least one metal selected from the group formed by group VIB and group VIII metals, with the following contents, in weight % with respect to the total catalyst mass:

the sum of the groups VIB and VIII metals, expressed as the oxides introduced into the catalyst, is in the range 0.1% to 50%, preferably 0.5% to 40%, more preferably 0.5% to 25%.

Said catalyst is characterized in that it also comprises at least one dopant selected from the group formed by boron, phosphorous, silicon (or a silica different from that which can be included in the support) and halogens with the following concentrations, in weight % with respect to the total catalyst mass.

0.1% to 20%, preferably 0.1% to 15%, more preferably 0.1% to 10% by weight of $B_2O_3$;

0.1% to 20%, preferably 0.1% to 15%, more preferably 0.1% to 10% by weight of $SiO_2$ (amounts higher than 1.6% (in particular 1.6%–10%) are often advantageous);

0.1% to 20%, preferably 0.1% to 15%, more preferably 0.1% to 10% by weight of $P_2O_5$, 0.1% to 20%, preferably 0.1% to 18%, more preferably 0.1% to 15% by weight of at least one element selected from group VIIA, preferably fluorine.

The group VIB and group VIII metals in the catalyst of the present invention can be completely or partially present in the form of the metal, oxide, sulphide, carbide, nitride or halide.

The catalysts of the invention can be prepared by any suitable method. Preferably, the dopant is introduced into the catalyst already containing the support and the group VIB and/or VIII metals. Preferably, a catalyst of the present invention of the NiMo or CoMo type on alumina is impregnated with an aqueous solution containing at least one dopant then optionally by an aqueous solution of at least one other dopant if there is a plurality thereof. The NiMo or CoMo catalyst on alumina can advantageously be impregnated with a common aqueous solution of a plurality of dopants.

More particularly, the process for preparing the catalyst of the present invention comprises the following steps.

a) drying and weighing a solid hereinafter termed the precursor, comprising at least the following compounds: the alumina support; at least one group VIB element and/or at least one group VIII element; and optionally a dopant, the whole preferably being formed;

b) impregnating the solid precursor defined in step a) with an aqueous solution containing one or more dopants;

c) leaving the moist solid in a moist atmosphere at a temperature in the range 10° C. to 80° C.;

d) drying the moist solid obtained in step b) at a temperature in the range 60° C. to 150° C.;

e) calcining the solid obtained from step c) at a temperature in the range 150° C. to 800° C.

The precursor defined in step a) above can be prepared using conventional methods known to the skilled person.

Step b) requires an aqueous solution containing the dopant and thus is different from conventional methods for depositing dopants which are known to the skilled person. When introducing boron and silicon, one preferred method of the invention consists of preparing an aqueous solution of at least one boron salt such as ammonium biborate or ammonium pentaborate in an alkaline medium and in the presence of hydrogen peroxide and introducing a silicone type silicon compound into the solution and then dry impregnating, wherein the pore volume in the precursor is filled with the solution containing boron and silicon. This method for depositing boron and silicon is better than the conventional method using an alcoholic solution of boric acid or a solution of ethyl orthosilicate in alcohol.

Briefly, the dopant or dopants can be introduced into the catalyst at various stages in the preparation and in various manners.

The support is preferably impregnated using the "dry" impregnation method which is well known to the skilled person. Impregnation can be carried out in a single step using a solution containing all of the constituent elements of the final catalyst.

The dopant or dopants can be introduced by one or more impregnation operations using an excess of solution onto the calcined precursor.

Thus, for example, in the preferred case where the precursor is a nickel-molybdenum type catalyst supported on alumina, it is possible to impregnate this precursor with an aqueous solution of ammonium biborate and/or Rhodorsil EIP silicone from Rhone Poulenc, to dry at 80° C., for example, then to impregnate with a solution of ammonium fluoride, to dry at 80° C., for example, and then to calcine, preferably carried out in air in a traversed bed, for example at 500° C. for 4 hours.

Other impregnation sequences can be carried out to obtain the catalyst of the present invention.

Thus it is possible to impregnate with the solution containing silicon, to dry, calcine then impregnate with the solution containing boron, to dry, then to carry out a final calcining step.

The preferred phosphorous source is orthophosphoric acid $H_3PO_4$, but its salts and esters such as alkaline phosphates, ammonium phosphates, gallium phosphate or alkyl phosphates are also suitable. Phosphorous acids, for example hypophosphorous acid, phosphomolybdic acid and its salts, or phosphotungstic acid and its salts can also be used. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, silicones, and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture.

The boron source can be boric acid, preferably orthoboric acid $H_3BO_3$, ammonium biborate or pentaborate, boron oxide, or boric esters. Boron can, for example, be introduced using a solution of boric acid in a water/alcohol mixture.

Sources of group VIIA elements (halogens) which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example by impregnating with an aqueous hydrofluoride solution or ammonium fluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention can comprise a group VIII element such as iron, cobalt or nickel.

Advantageously, when using both a group VIB metal and a group VIII metal, the following combinations of metals are used: nickel-molybdenum, cobalt-molybdenum, iron-molybdenum, iron-tungsten, nickel-tungsten, cobalt-tungsten. Preferred combinations are: nickel-molybdenum and cobalt-molybdenum. It is also possible to use combinations of three metals, for example nickel-cobalt-molybdenum.

The sources of the group VIII elements which can be used are well known to the skilled person. Examples are nitrates, sulphates, phosphates, halides, for example chlorides, bromides and fluorides, and carboxylates, for example acetates and carbonates.

It is also possible to use, as a support, an alumina such as that described above (also known as "flash") comprising 1% to 30%, preferably 5% to 20% by weight of an alumina gel, for example a sulphuric gel. This proportion of alumina gel improves the mechanical properties of the support in particular when the support is mixed. Flash alumina is an adhesive paste and thus spreads onto the mixer screw. The presence of the gel renders milling easier without subsequent loss of support efficacy.

The catalysts of the invention can thus be used in all processes for hydrorefining and hydroconverting hydrocarbon feeds such as petroleum cuts, cuts originating from coal, extracts from bituminous sands and bituminous schists, or hydrocarbons produced from natural gas, more particularly for hydrogenation, hydrodenitrogenation, hydrodeoxygenation, hydrodearomatisation, hydroisomerisation, hydrodealkylation, hydrodewaxing, dehydrogenation, hydrocracking, hydrodesulphuration and hydrodemetallization of carbon-containing feeds containing aromatic compounds and/or olefinic compounds and/or naphthenic compounds and/or paraffininc compounds, the feeds possibly containing metals and/or nitrogen and/or oxygen and/or sulphur. In particular, by modifying the parameters for preparing the essentially alumina-based support, it is possible to obtain different pore distributions and thus to modify the hydrodesulphuration (HDS) and hydrodemetallization (HDM) proportions.

Hydrorefining and hydroconversion of hydrocarbon feeds (hydrotreatment) can be carried out in a reactor containing the catalyst of the invention in a fixed bed. Such hydrotreatments can be applied, for example, to petroleum fractions such as crude oils with an API degree of less than 20, bituminous sand extracts and bituminous schists, atmospheric residues, vacuum residues, asphalts, deasphalted oils, deasphalted vacuum residues, deasphalted crudes, heavy fuels, atmospheric distillates and vacuum distillates, or other hydrocarbons such as liquefied coal products. In a fixed bed process, the hydrotreatments designed to eliminate impurities such as sulphur, nitrogen or metals, and to reduce the average boiling point of these hydrocarbons are normally carried out at a temperature of about 320° C. to about 450° C., preferably about 350° C. to 430° C., at a partial pressure of hydrogen of about 3 MPa (megapascals) to about 30 MPa, preferably 5 to 20 MPa, at a space velocity of about 0.1 to about 5 volumes of feed per volume of catalyst per hour, preferably 0.2 to 1 volume per volume of catalyst per hour, the ratio of gaseous hydrogen to the liquid hydrocarbon feed being in the range 200 to 5000 normal cubic meters per cubic meter ($Nm^3/m^3$), preferably between 500 and 1500 $Nm^3/m^3$.

The following examples illustrate the invention without limiting its scope.

EXAMPLE 1

Preparation of Alumina Support A Forming Part of the Composition of Catalyst A (In Accordance with the Invention)

Step $a_1$—Starting Alumina: The starting material was alumina obtained by very rapid decomposition of hydrargillite in a hot air stream (T=1000° C.). The product obtained was constituted by a mixture of transition aluminas: (khi) and (rho) aluminas. The specific surface area of the product was 300 $m^2/g$ and the loss on ignition (LOI) was 5%.

Step $b_1$—Rehydration: The alumina was rehydrated by taking it into suspension in water at a concentration of 500 g/l at a temperature of 90° C. for a period of 48 h in the presence of 0.5% citric acid.

After filtering the suspension, a cake of alumina was recovered which was washed with water then dried at a temperature of 140° C. for 24 h.

The alumina obtained was in the form of a powder, its loss on ignition (LOI), measured by calcining at 1000° C., and its amount of alumina in the form of boehmite, measured by X ray diffraction, are shown in Table 1.

Step $c_1$—mixing: 10 kg of rehydrated and dried powder was introduced into a 25 l volume Z blade mixer and an emulsion of hydrocarbon in water stabilised by a surfactant, obtained using a stirred reactor, and 69% nitric acid, was gradually added. The characteristics are shown in Table 1.

Mixing was maintained until a consistent homogeneous paste was obtained. After mixing, a 20% ammonia solution was added to neutralise the excess nitric acid, continuing mixing for 3 to 5 min.

Step $d_1$—Extrusion: The paste obtained was introduced into a single screw extruder to obtain raw extrudates with a diameter of 1.6 mm.

Step $e_1$—Drying/calcining: The extrudates were then dried at 140° C. for 15 h and calcined for 12 h at a temperature of 680° C. The calcined support had a specific surface area of 148 $m^2/g$.

Step $f_1$—Hydrothermal treatment: The extrudates obtained were impregnated with a solution of nitric and acetic acid in the following concentrations: 3.5% of nitric acid with respect to the weight of alumina and 6.5% of acetic acid with respect to the weight of alumina. They then underwent hydrothermal treatment in a rotating basket autoclave under the conditions defined in Table 1.

Step $g_1$—Drying/calcining: At the end of this treatment, the extrudates were calcined at a temperature of 550° C. for 2 h. The amount of boehmite shown in Table 1 was measured for the extrudates prior to final calcining.

The characteristics of the extruded alumina support A obtained are shown in Table 1.

EXAMPLE 2

Preparation of Catalyst A1 (Comparative)

We dry impregnated the extruded support A of Example 1 with an aqueous solution containing molybdenum and nickel salts. The molybdenum salt was ammonium heptamolybdate $Mo_7O_{24}(NH_4)_6.4H_2O$ and the nickel salt was nickel nitrate $Ni(NO_3)_2.6H_2O$.

After ageing at room temperature in a water-saturated atmosphere, the impregnated extrudates were dried overnight at 120° C. then calcined at 500° C. for 2 hours in air. The final molybdenum trioxide content was 12% by weight and that of nickel oxide NiO was 3% by weight. Catalyst A1 was thus obtained, in accordance with French patent 97/07149 filed on Jun. $11^{th}$ 1997.

EXAMPLE 3

Preparation of Catalyst B (In Accordance with the Invention)

We dry impregnated the extrudates of the $NiMo/Al_2O_3$ catalyst A1 of Example 2 using an aqueous solution comprising Rhodorsyl EP1 silicone emulsion. After ageing at room temperature in a water-saturated atmosphere, the impregnated extrudates were dried overnight at 120° C. then calcined at 500° C. for 2 hours in air. The final $SiO_2$ content was 2.2% by weight.

TABLE 1

| | Alumina A |
|---|---|
| Rehydrated alumina - end of step b1 | |
| % boehmite | 24 |
| LOI (1000° C.) | 25 |
| Mixing - step c1 | |
| Hydrocarbon type | petroleum |
| % HNO3/Al2O3 | 10 |
| % hydrocarbon/Al2O3 | 15 |
| water/hydrocarbon | 3.7 |
| Surfactant type | Galoryl EM 10 |
| % surfactant/hydrocarbon | 17 |
| Time (h) | 2.15 |
| % neutralisation with respect to HNO3, equivalents | 65 |
| Drying/calcining - step e1 | |
| Calcining temperature (° C.) | 680 |
| Specific surface area ($m^2/g$) | 148 |
| Hydrothermal treatment - step f1 | |
| Temperature (° C.) | 212 |
| Pressure (bar) | 19 |
| Time (h) | 2 |
| % boehmite | 40 |
| Characteristics of calcined extrudates obtained | |
| TPV ($cm^3/g$) | 0.80 |
| $V_{60}$–$V_{1000 Å}$ ($cm^3/g$) | 0.60 |
| $V_{1000 Å}$ ($cm^3/g$) | 0.19 |
| Av. mesopore diameter (Å) | 280 |
| $V_{0–60 Å}$ ($cm^3/g$) | 0.02 |
| Specific surface area ($m^2/g$) | 140 |
| ACS (daN/mm) | 1.2 |
| CS (MPa) | 1.58 |

EXAMPLE 4

Preparation of Catalyst C (In Accordance with the Invention)

We dry impregnated support A of Example 1 using an aqueous solution comprising ammonium heptamolybdate, nickel nitrate and phosphoric acid. After ageing at room temperature in a water-saturated atmosphere, the impregnated extrudates were dried overnight at 120° C. then calcined at 500° C. for 2 hours in air. The final $MoO_3$ content was 11.8%, the NiO content was 2.8% and the $P_2O_5$ content was 5.5% by weight.

EXAMPLE 5

Preparation of catalyst D (In Accordance with the Invention)

We dry impregnated extrudates of the $NiMo/Al_2O_3$ catalyst A1 of Example 2 using an aqueous solution comprising ammonium difluoride. After ageing at room temperature in a water-saturated atmosphere, the impregnated extrudates were dried overnight at 120° C. then calcined at 500° C. for 2 hours in air. The final fluorine content was 1.2% by weight.

EXAMPLE 6

Preparation of Catalyst A2 (Comparative)

We dry impregnated the extruded support A of Example 1 using an aqueous solution comprising nickel nitrate $Ni(NO_3)_2.6H_2O$. After ageing at room temperature in a water-saturated atmosphere, the impregnated extrudates were dried overnight at 120° C. then calcined at 500° C. for 2 hours in air. The final NiO content was 5% by weight. A catalyst A2 was obtained in accordance with French patent 97/07149.

EXAMPLE 7

Preparation of Catalyst E (In Accordance with the Invention)

We dry impregnated the extrudates of the $Ni/Al_2O_3$ catalyst A2 of Example 6 using an aqueous solution comprising Rhodorsyl EP1 silicone emulsion. After ageing at room temperature in a water-saturated atmosphere, the impregnated extrudates were dried overnight at 120° C. then calcined at 500° C. for 2 hours in air. The final $SiO_2$ content was 6.8% by weight.

EXAMPLE 8

Preparation of Catalyst A3 (Comparative)

We dry impregnated the extruded support A of Example 1 with an aqueous solution containing ammonium heptamolybdate $Mo_7O_{24}(NH_4)_6.4H_2O$. After ageing at room temperature in a water-saturated atmosphere, the impregnated extrudates were dried overnight at 120° C. then calcined at 500° C. for 2 hours in air. The final molybdenum trioxide $MoO_3$ content was 8% by weight. A catalyst A3 was obtained in accordance with French patent 97/07149.

EXAMPLE 9

Preparation of Catalyst F (In Accordance with the Invention)

We dry impregnated the extrudates of the $Mo/Al_2O_3$ catalyst A3 of Example 6 using an aqueous solution comprising ammonium biborate. After ageing at room temperature in a water-saturated atmosphere, the impregnated extrudates were dried overnight at 120° C. then calcined at 500° C. for 2 hours in air. The final $B_2O_3$ content was 4.5% by weight.

EXAMPLE 10

Hydroconversion Tests Using Catalysts A1, A2, A3 and B to F for Petroleum Residues Catalysts A1, A2, A3, B, C, D, E and F described above were compared in a hydrotreatment test for different petroleum residues. They were an atmospheric residue (AR) of Middle Eastern origin (Arabian Light) and an atmospheric residue from an extra heavy Venezuelan crude (Boscan). These two residues were characterized by high viscosities, high Conradson carbon numbers and high asphaltene contents. The Boscan AR also contained very high amounts of nickel and vanadium.

The characteristics of these residues are shown in the following table:

|  |  | Arabian Light AR S4658 | Boscan AR S3345 |
|---|---|---|---|
| Density 15/4 |  | 0.959 | 1.023 |
| Viscosity at 100° C. | cSt | 25.6 | 1380 |
| Viscosity at 150° C. | cSt | 7.66 | 120 |
| Sulphur | % by wt | 3.34 | 5.5 |
| Nitrogen | ppm | 2075 | 5800 |
| Nickel | ppm | 9 | 125 |
| Vanadium | ppm | 35 | 1290 |
| Iron | ppm | 1 | 8 |
| Carbon | % by wt | 84.7 | 83.40 |
| Hydrogen | % by wt | 11.2 | 10.02 |
| Aromatic carbon | % | 26 | 29.0 |
| Molecular weight | g/mol | 460 | 730 |
| Conradson carbon | % by wt | 9.5 | 16.9 |
| C5 asphaltenes | % by wt | 5.6 | 24.1 |
| C7 asphaltenes | % by wt | 3.1 | 14.9 |
| SARA | % by wt |  |  |
| Saturates | % by wt | 30.7 | 8.7 |
| Aromatics | % by wt | 47.5 | 35.0 |
| Resins | % by wt | 17.6 | 34.0 |
| Asphaltenes | % by wt | 3.0 | 14.6 |
| Simulated distillation |  |  |  |
| IP | ° C. | 229 | 224 |
| 5% | ° C. | 325 | 335 |
| 10% | ° C. | 358 | 402 |
| 20% | ° C. | 404 | 474 |
| 30% | ° C. | 436 | 523 |
| 40% | ° C. | 468 | 566 |
| 50% | ° C. | 503 |  |
| 60% | ° C. | 543 |  |
| 70% | ° C. | 590 |  |
| 80% | ° C. | 642 |  |

The tests were carried out in a pilot hydrotreatment plant for petroleum residues comprising a fixed bed tube reactor. The reactor was filled with one liter of catalyst. The fluid flow (petroleum residue+hydrogen recycle) was an upflow in the reactor. This type of pilot unit represents the operation of an IFP HYVAHL unit reactor for fixed bed hydroconversion of residues.

After a sulphuration step by circulating a gas oil cut with added DMDS at a final temperature of 350° C. in the reactor, the unit was operated with the petroleum residues described above under the following operating conditions:

| | |
|---|---|
| Total pressure | 15 MPa |
| Temperature | 380° C. |
| Hourly space velocity of residue | 0.5 h$^{-1}$ |
| Hydrogen recycle | 1000 std l. H$_2$/l. feed |
| Cycle start temperature | 370° C. |

Arabian light AR was injected first. After a 250 hour stabilisation period, the hydrodesulphuration (HDS) and hydrodemetallization (HDM) performances and the conversion of the fraction with a boiling point of more than 550° C. (Conv 550° C.$^+$) were as follows:

| Catalyst | HDS (% wt) | HDM (% wt) | Conv 550° C. (wt %) |
|---|---|---|---|
| Catalyst A1 | 67 | 78 | 25 |
| Catalyst B | 71 | 80 | 32 |
| Catalyst C | 69 | 78 | 28 |
| Catalyst D | 71 | 81 | 29 |
| Catalyst A2 | 58 | 72 | 20 |
| Catalyst E | 62 | 73 | 27 |
| Catalyst A3 | 60 | 74 | 22 |
| Catalyst F | 64 | 75 | 26 |

The HDS ratio is defined as follows:

HDS (wt %)=((wt % S)feed−(wt % S)test)/(wt % S)feed * 100

The HDM ratio is defined as follows:

HDM (wt %)=((ppm wt Ni+V)feed−(ppm wt Ni+V)test)/(ppm wt Ni+V)feed * 100

The degree of conversion is defined as follows:

Conversion (wt %)=((wt % of 550° C.+)feed−(wt % of 550° C.+)test)/(wt % of 550° C.+)feed * 100.

The feed was then changed by moving to the Boscan atmospheric residue. The test conditions aimed to maintain the HDM ratio constant at about 80% by weight throughout the cycle. To this end, catalyst deactivation was compensated for by a gradual increase in the reaction temperature. The test was stopped when the reaction temperature reached 420° C., a temperature considered to be representative of the temperature at the end of a cycle in an industrial residue hydroconversion unit.

The following table compares the quantities of nickel+ vanadium from the Boscan AR deposited on the 8 catalysts and the HDS level at the middle of the cycle

| Catalyst | Ni + V deposited (% of weight of fresh catalyst) | Mid cycle HDS (wt %) |
|---|---|---|
| Catalyst A1 | 80 | 52 |
| Catalyst B | 82 | 58 |
| Catalyst C | 81 | 54 |
| Catalyst D | 81 | 56 |
| Catalyst A2 | 82 | 50 |
| Catalyst E | 84 | 53 |
| Catalyst A3 | 83 | 50 |
| Catalyst F | 83 | 55 |

It thus appears that the HDM catalysts in the form of extrudates of the present invention can lead to HDS and HDM performances and to conversions which are higher than those of catalysts A1, A2 and A3 (comparative examples) while achieving at least identical performances for retention of nickel+vanadium metals. The gain in performance was observed both for the Arabian Light and the Boscan atmospheric residue.

What is claimed is:

1. A catalyst comprising an essentially alumina-based extruded support, essentially constituted by a plurality of juxtaposed agglomerates, at least one metal or metal compound selected from the group consisting of metals from group VIB, compounds of metals from group VIB, metals from group VII, and compounds of metals from group VII, in which the sum S of the group VIB and VII metals, expressed as the oxides, is in the range 0.1% to 50% by weight, wherein each of said agglomerates is partly in the form of packs of flakes and partly in the form of needles, said needles being uniformly dispersed both about the packs of flakes and between the flakes, and the catalyst further comprises at least one dopant selected from the group formed by phosphorus, boron, silicon, a silica which is not contained in the selected support, and halogens.

2. A catalyst according to claim 1, wherein said at least one dopant is present in the following concentrations 0.1% to 20% by weight of B$_2$O$_3$;
0.1% to 20% by weight of SiO$_2$;
0.1% to 20% by weight of P$_2$O$_5$; and/or
0.1% to 20% by weight of halogen.

3. A catalyst according to claim 2, wherein when the dopant is boron, the boron content is in the range 0.1% to 15% by weight of B$_2$O$_3$, when the dopant is silicon, the silicon content is in the range 0.1% to 15% by weight of SiO$_2$, when the dopant is phosphorus, the phosphorus content is in the range 0.1% to 15% by weight of P$_2$O$_5$, and when the dopant is a halogen, the halogen content is in the range 0.1% to 18%, by weight of halogen.

4. A catalyst according to claim 1, in which the sum S of the group VIB and VIII elements is in the range of 0.5% to 40% by weight.

5. A catalyst according to claim 1, in which the alumina agglomerates are obtained by forming a starting alumina originating from dehydration of hydrargillite, and in which the amount of alumina resulting from boehmite decomposition during preparation of the alumina agglomerates is in the range 5% to 70% by weight.

6. A catalyst according to claim 1, in which the total pore volume of the catalyst is at least 0.6 cm$^3$/g, and the average diameter of the mesopores is in the range 15 to 36 nm.

7. A catalyst according to claim 1, in which the mesoporous volume $V_{6nm}$–$V_{100nm}$ is at least 0.3 cm$^3$/g, the macroporous volume $V_{100nm}$ is at most 0.5 cm$^3$/g and the microporous volume $V_{0-6nm}$ is at most 0.55 cm$^3$/g.

8. A catalyst according to claim 7, comprising molybdenum and nickel, wherein the alumina agglomerates are obtained by forming a starting alumina originating from dehydration of hydrargillite, in which the amount of alumina resulting from boebmite decomposition during preparation of the alumina agglomerates is in the range 5% to 70% by weight, and wherein the at least one dopant is a silica obtained by impregnating the support with a silicon emulsion and calcining the catalyst.

9. A catalyst according to claim 1, in which the catalytic metal or the compound of a catalytic metal from group VIB is molybdenum or tungsten, and the catalytic metal or the compound of a catalytic metal from group VIII is iron, nickel or cobalt.

10. A catalyst according to claim 1, in which the catalytic metal or the compound of a catalytic metal from group VIB is molybdenum, and the catalytic metal or the compound of a catalytic metal from group VIII is nickel.

11. A catalyst according to claim 1, in which the diameter of the alumina extrudates is in the range 0.5 to 10 mm.

12. A catalyst according to claim 1, in which the catalyst support also comprises up to 30% by weight of an alumina gel.

13. A process for producing a catalyst according to claim 1, in which at least one solution containing said dopant is introduced into a precursor catalytic mass based on said alumina-based extruded support comprising at least one group VIB metal, compound of group VIB metal, group VIII metal, or a compound of group VIII metal.

14. A process according to claim 13, in which when the catalyst comprises a plurality of dopants, one thereof may already have been introduced into the precursor, the others are introduced into said precursor, in isolation or together, using at least one solution containing said dopants.

15. A process for preparing a catalyst according to claim 1, comprising the following steps:
  a) forming an essentially alumina-based support to obtain extrudates;
  b) impregnating the extrudates with a solution comprising at least one catalytic metal compound from group VIB, optionally followed by ageing and/or drying, then followed by calcining;
  c) impregnating the extrudates with a solution comprising at least one catalytic metal compound from group VIII, optionally followed by ageing and/or drying, followed by calcining.

16. A process according to claim 15, characterized in that the process for forming the alumina-based support comprises the following steps:
  a1 starting with an alumina originating from dehydration of hydrargillite;
  b1 rehydrating the starting alumina;
  c1 mixing the rehydrated alumina in the presence of an emulsion of at least one hydrocarbon in water;
  d1 extruding the alumina-based paste obtained from step c1;
  e1 drying and calcining the extrudates;
  f1 carrying out a hydrothermal acid treatment in a conformed atmosphere on the extrudates from step e1;
  g1 drying and calcining the extrudates from step f1.

17. A process according to claim 15, characterized in that the process for forming the alumina-based support comprises the following steps:
  a2 starting from a starting alumina originating from dehydration of hydrargillite;
  b2 forming the alumina into beads in the presence of a pore-forming agent;
  c2 ageing the alumina beads obtained;
  d2 mixing the beads from step c2 to obtain a paste which is extruded;
  e2 drying and calcining the extrudates obtained;
  f2 carrying out a hydrothermal acid treatment in a confined atmosphere on the extrudates obtained from step e2;
  g2 drying and calcining the extrudates from step f2.

18. A process according to claim 15, characterized in that the process for forming the alumina-based support comprises the following steps:
  a3 starting from a starting alumina originating from dehydration of hydrargillite;
  b3 rehydrating the starting alumina;
  c3 mixing the rehydrated alumina with a pseudo-boehmite gel, said gel being present in an amount of 1% to 30% by weight with respect to the rehydrated alumina and the gel;
  d3 extruding the alumina-based paste obtained from step c3;
  e3 drying and calcining the extrudates obtained;
  f3 carrying out a hydrothermal acid treatment in a confined atmosphere on the extrudates obtained from from step e3;
  g3 optionally drying, then calcining the extrudates from step f3.

19. A process for preparing a catalyst according to claim 1, comprising the following steps:
  a) forming a starting alumina to obtain extrudates;
  b) impregnating the extrudates with a solution comprising at least one catalytic metal compound from group VIB, optionally followed by ageing and/or drying, then followed by calcining;
  c) impregnating the extrudates with a solution comprising at least one catalytic metal compound from group VIII optionally followed by aging and/or drying, then optionally followed by calcining.

20. A process for preparing a catalyst according to claim 1, characterized in that it comprises the following steps:
  a) co-mixing alumina powder originating from dehydration of hydrargillite and optionally an alumina gel with at least one compound of a catalytic metal from group VIB and/or at least one compound of a catalytic metal from group VIII, optionally followed by ageing and/or drying, then optional calcining;
  b) forming by extruding the product obtained from step a).

21. In a process for hydrotreating a hydrocarbon feed in a fixed bed comprising contacting the feed with a catalyst, the improvement wherein the catalyst is in accordance with claim 1.

22. A process according to claim 21, in which the hydrocarbon feed includes vanadium and/or nickel and/or iron and/or sodium and/or titanium and/or silica and/or copper.

23. A process according to claim 21, in which the hydrocarbon feed includes sulphur and/or nitrogen and/or oxygen.

24. A process according to claim 21, in which the hydrotreatment process is carried out at a temperature of 320° C. to about 450° C., at a partial pressure of hydrogen of about 3 MPa to about 30 MPa, at a space velocity of about 0.1 to about 5 volumes of feed per volume of catalyst per hour, the ratio of gaseous hydrogen to the liquid hydrocarbon feed being in the range 200 to 5000 normal cubic meters per cubic meter ($Nm^3/m^3$).

* * * * *

UNITED STATES PATENT AND TRADEMARK OFFICE
CERTIFICATE OF CORRECTION

| | |
|---|---|
| PATENT NO. | : 6,436,280 B1 |
| APPLICATION NO. | : 09/457518 |
| DATED | : August 20, 2002 |
| INVENTOR(S) | : Virginie Harle et al. |

It is certified that error appears in the above-identified patent and that said Letters Patent is hereby corrected as shown below:

Column 16, line 10, reads "group VII, and" should read -- group VIII, and --

Column 16, line 10, reads "group VII," should read -- group VIII, --

Column 16, line 11, reads "VII metals," should read -- VIII metals, --

Column 17, lines 42 and 43, read "conformed atmosphere" should read -- confined atmosphere --

Signed and Sealed this

Twentieth Day of February, 2007

JON W. DUDAS
*Director of the United States Patent and Trademark Office*